United States Patent
Shin et al.

(10) Patent No.: US 10,794,643 B2
(45) Date of Patent: Oct. 6, 2020

(54) COOLING TOWER WIND WALL SYSTEM

(71) Applicant: Baltimore Aircoil Company, Inc., Jessup, MD (US)

(72) Inventors: Yoon K. Shin, Ellicott City, MD (US); Gregory Adam Russell, Catonsville, MD (US); Ryan J. Most, Spring Grove, PA (US); Ravindra Singh, Gaithersburg, MD (US); David Andrew Aaron, Reisterstown, MD (US); Frank T. Morrison, Crownsville, MD (US)

(73) Assignee: BALTIMORE AIRCOIL COMPANY, INC., Jessup, MD (US)

( * ) Notice: Subject to any disclaimer, the term of this patent is extended or adjusted under 35 U.S.C. 154(b) by 326 days.

(21) Appl. No.: 15/837,933

(22) Filed: Dec. 11, 2017

(65) Prior Publication Data

US 2018/0172367 A1  Jun. 21, 2018

Related U.S. Application Data

(60) Provisional application No. 62/436,088, filed on Dec. 19, 2016, provisional application No. 62/483,759, filed on Apr. 10, 2017.

(51) Int. Cl.
*F28F 25/12* (2006.01)
*F28F 19/00* (2006.01)
(Continued)

(52) U.S. Cl.
CPC .............. *F28F 25/12* (2013.01); *B01D 1/20* (2013.01); *B01D 5/003* (2013.01); *F28C 1/12* (2013.01);
(Continued)

(58) Field of Classification Search
CPC ... B01D 1/20; B01D 5/003; F28C 1/12; F28C 1/16; F28F 19/006; F28F 25/087; F28F 25/12; F28F 2025/005
(Continued)

(56) References Cited

U.S. PATENT DOCUMENTS 2,437,484 A * 3/1948 Simons ................... F28F 25/12
261/109
2,680,603 A 6/1954 Taylor
(Continued)

FOREIGN PATENT DOCUMENTS

CN 204806918 U * 11/2015

OTHER PUBLICATIONS

Cooling Towers—Free Cooling Operation, Evapco Brochure, believed to be publicly available on Apr. 16, 2010, Evapco Engineering Bulletin No. EB23D, 28 pages.

*Primary Examiner* — Charles S Bushey
(74) *Attorney, Agent, or Firm* — Amsted Industries Incorporated

(57) ABSTRACT

A cooling tower is provided having a heat exchange section, and a fan for moving air through the heat exchange section. A water distribution assembly provides water onto and through the heat exchange section. An air inlet section is provided through which air is drawn into the cooling tower and the heat exchange section. The air inlet section has outside edges and corners. A wall assembly is provided in the air inlet section, with the wall assembly extending from the corners of the air inlet section inwardly. The water passing through the heat exchange section enters the air inlet section, and exits to a sump beneath the air inlet section. The air inlet section is comprised of a structure having outside edges and corners, and the wall assembly is comprised of a plurality of wall panel sections. Each wall panel section has an outer edge at a corner of the air inlet section, and each wall panel section extends inwardly from the corner of the air inlet section.

24 Claims, 12 Drawing Sheets

(51) Int. Cl.
*B01D 1/20* (2006.01)
*B01D 5/00* (2006.01)
*F28C 1/12* (2006.01)
*F28C 1/16* (2006.01)
*F28F 25/00* (2006.01)
*F28F 25/08* (2006.01)

(52) U.S. Cl.
CPC .............. *F28C 1/16* (2013.01); *F28F 19/006* (2013.01); *F28F 25/087* (2013.01); *F28F 2025/005* (2013.01)

(58) Field of Classification Search
USPC ................................... 261/127, 30, DIG. 11
See application file for complete search history.

(56) References Cited

U.S. PATENT DOCUMENTS

| | | | |
|---|---|---|---|
| 2,907,554 A | | 10/1959 | Heller |
| 3,743,257 A | | 7/1973 | Fordyce |
| 3,844,344 A | | 10/1974 | Kliemann et al. |
| 3,933,196 A | | 1/1976 | Heller et al. |
| 4,094,937 A | * | 6/1978 | Bodick ..................... F28C 1/02 261/109 |
| 4,159,738 A | * | 7/1979 | Sedille ..................... F28B 1/06 165/125 |
| 5,811,035 A | * | 9/1998 | Mockry .................. E04B 5/026 261/111 |

\* cited by examiner

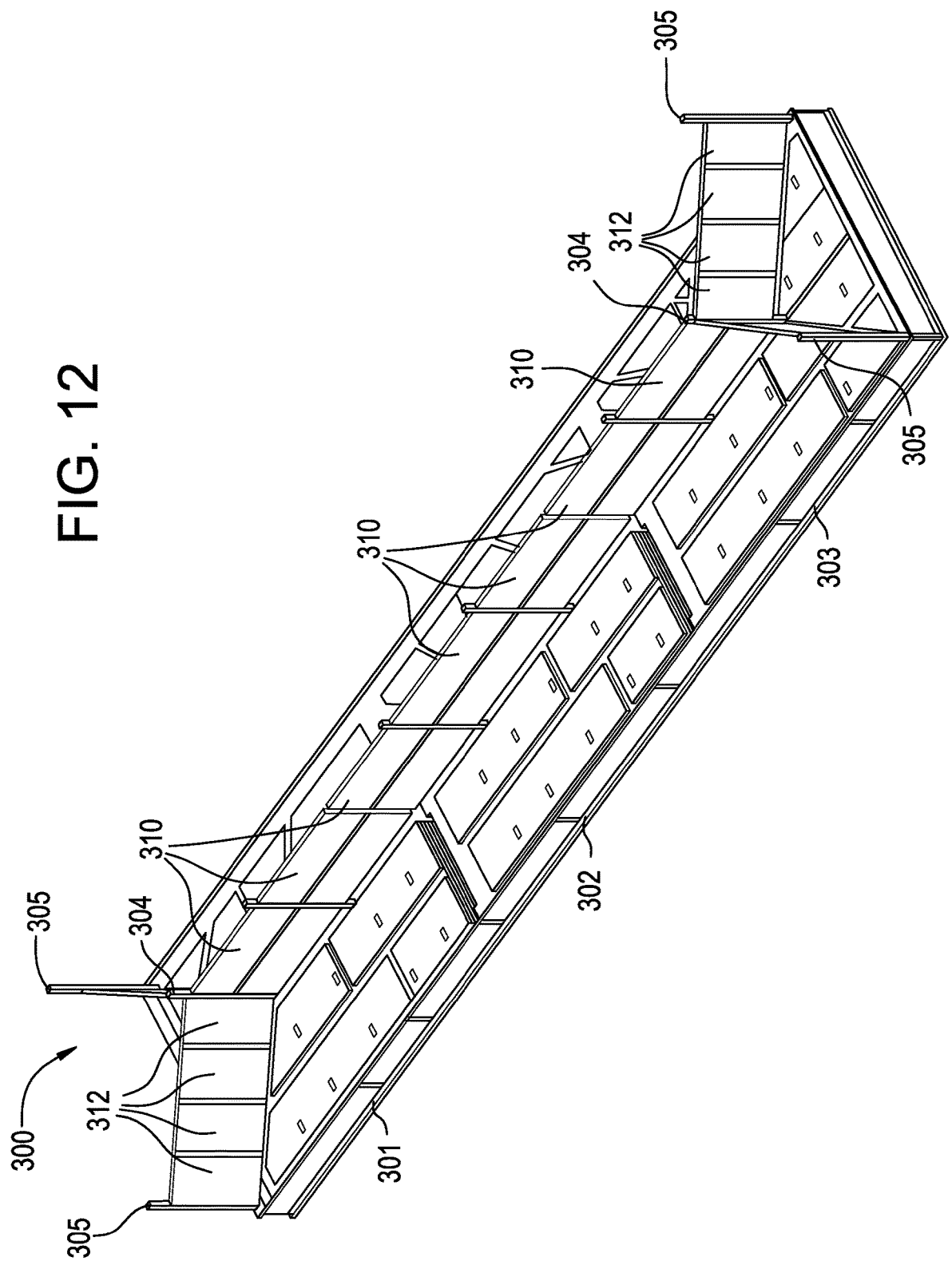

COOLING TOWER WIND WALL SYSTEM

BACKGROUND OF THE INVENTION

The present invention relates generally to an improved wind wall system used within evaporative heat exchange apparatus such as cooling towers, closed circuit fluid coolers, fluid heaters, condensers, evaporators, air coolers or air heaters.

In an evaporative cooling tower, evaporative liquid from a heat load source is sprayed from the top onto a direct heat exchange surface in what is deemed a rain zone and air is moved through the direct heat exchanger to transfer heat from the water directly to the leaving air stream. During winter operation when the ambient air temperature is below freezing, and especially during severe windy conditions, it is desirable that the water falling in the rain zone from the evaporative heat exchanger and into the water collection sump be kept from blowing out of the cooling tower structure or from freezing on surfaces where the ice will cause operational or safety issues.

This invention deals with an improved wind wall system which keeps prevailing winds from blowing water in the rain zone from exiting the evaporative heat exchanger either outside the tower or onto inlet louvers which will freeze and block airflow.

It is an object of the invention to create a wind wall system which prevents wind from blowing water out of the cooling tower.

It is another object of the invention to create a wind wall system which prevents wind from blowing water onto the interior components such as inlet louvers which will block airflow when the ambient is below freezing.

It is another object of the invention to create a wind wall system consisting of a top evaporative heat exchanger, a bottom water collection sump, inlet louvers surrounding the perimeter, and wind walls where the wind velocity is reduced and guided into each wind wall zone such that the wind air velocity vector points to the center of the wind walls and therefore cannot exit the wind wall zone from the cooling tower and is allowed to exit through the evaporative heat exchanger.

It is another object of the invention to have removable wind walls to insure proper summertime operation and an ease of maintenance while insuring an easy installation for safe winter operation.

It is another object of the invention to have an automatically retractable wind walls to insure proper summertime operation and ease of maintenance while insuring safe winter operation.

SUMMARY OF THE INVENTION

The present invention provides an improved wind wall system that is used in an evaporative heat exchange system such as a cooling tower, closed circuit fluid cooler, fluid heater, condenser, evaporator, air cooler or air heater. A typical evaporative cooling tower heat exchange apparatus has a direct heat exchanger, a fan system, a means for spraying water onto the heat exchange surface and a lower sump to collect the evaporative liquid. The type of heat exchanger can be either an indirect heat exchanger, a direct heat exchanger or a combination of the two.

The indirect heat exchanger may be a coil or a plate style heat exchanger with process fluid flowing inside. The direct heat exchanger can be a fill pack which is typically made of plurality of individual thin plastic PVC fill sheets spaced apart using spacers. Fill sheets can be either hung underneath the spray system or cut into smaller pieces and bundled into plurality of small fill blocks which are then stacked on top of each other underneath the spray system. Spray water flows down from the top onto both faces of each fill sheet and adheres to the surface contour of each fill sheet. A stream of air is either forced through or pulled through the fill air gaps by a fan system so that heat transfer occurs between the spray water and air stream. Above the fill pack is some type of spray system to allow for a somewhat uniform flow of water over the heat exchange surface. Water to be heated or cooled enters the spray system causing a well distributed water stream that flows over the heat exchange surface. As the evaporative spray water exits the heat exchange surface, it falls through a distance of a few inches to several feet called a rain zone then into the lower water collection sump where it is collected and pumped back to the process for a direct heat exchanger or pumped back to the top of the indirect heat exchanger.

To help prevent rain zone water that falls from the bottom of the evaporative heat exchanger from leaving the cooling tower there are inlet louvers that are designed to allow air to come through but which catch and guide the dropping rain zone water into the lower sump. When there is an extreme wind, and especially when the cooling tower fan is running at a very slow speed or is off, without the wind wall system, the raining water can be blown outside of the cooling tower through the inlet louvers. Any water that is blown through the inlet louvers and outside of the cooling tower in sub-zero ambient conditions will freeze around the outside of the cooling tower causing safety issues. In addition, when it is extremely windy and the ambient air temperature is below freezing, any water that is caught and guided by the inlet louvers to the lower basin will freeze and can eventually block all the airflow into the cooling tower.

In a preferred embodiment, a wind wall system minimizes the effect of the wind velocity such that the water leaving the evaporative heat exchange surface that falls in the rain zone cannot be blown onto the inlet louvers or cannot be blown out of the cooling tower. The wind wall system consists of a top evaporative heat exchanger, a bottom water collection sump, inlet louvers and wind walls. The inlet louvers are installed around the perimeter of the cooling tower which, regardless of the wind direction, slows the wind velocity down and also guides the wind generally perpendicular through the inlet louvers towards the wind walls. The wind walls are installed generally diagonally starting from one corner to its opposite corner and crossing at least one other wind wall generally in the middle of the cooling tower thereby creating at least four generally triangular wind wall zones. The wind wall system functions to slow down the wind, redirects and traps the wind into a wind wall zone, and corners the wind into the middle of the rain zone to prevent the water carrying wind from leaving the wind wall zone. By installing the wind walls from the corners to the middle and guiding the wind towards the wind walls, the wind wall system forces the tangential wind velocity vector to always point to the center of the wind walls and therefore keeps the rain zone falling water from being blown out of the cooling tower.

BRIEF DESCRIPTION OF THE DRAWINGS

In the drawings,

FIG. 12 is a perspective view of a wind wall system for a multiple cell embodiment of the present invention.

DESCRIPTION OF THE PREFERRED EMBODIMENT

Figure 1:
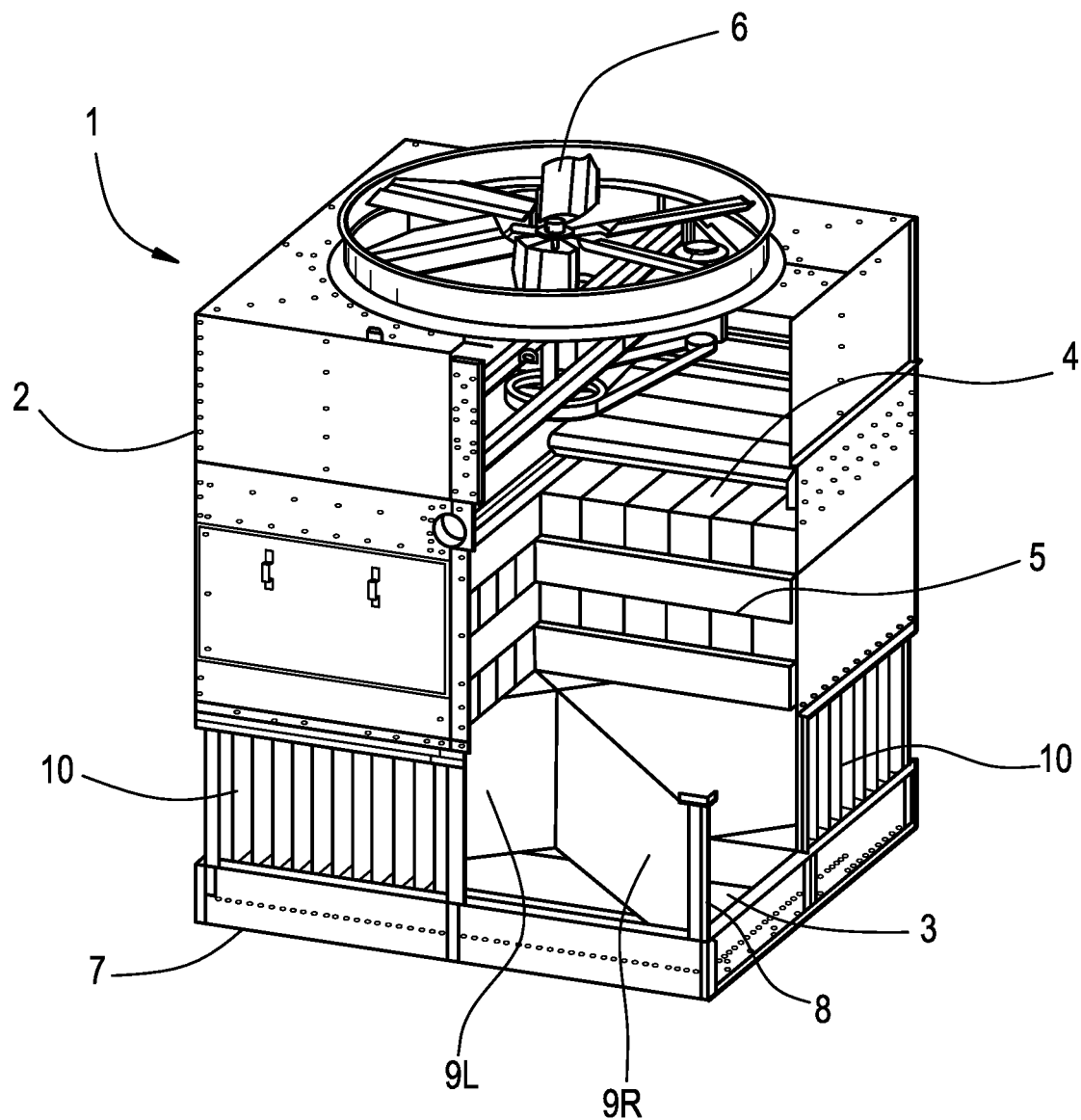
FIG. 1 is a perspective view of a direct heat exchange apparatus in accordance with the present invention.
Figure 2:
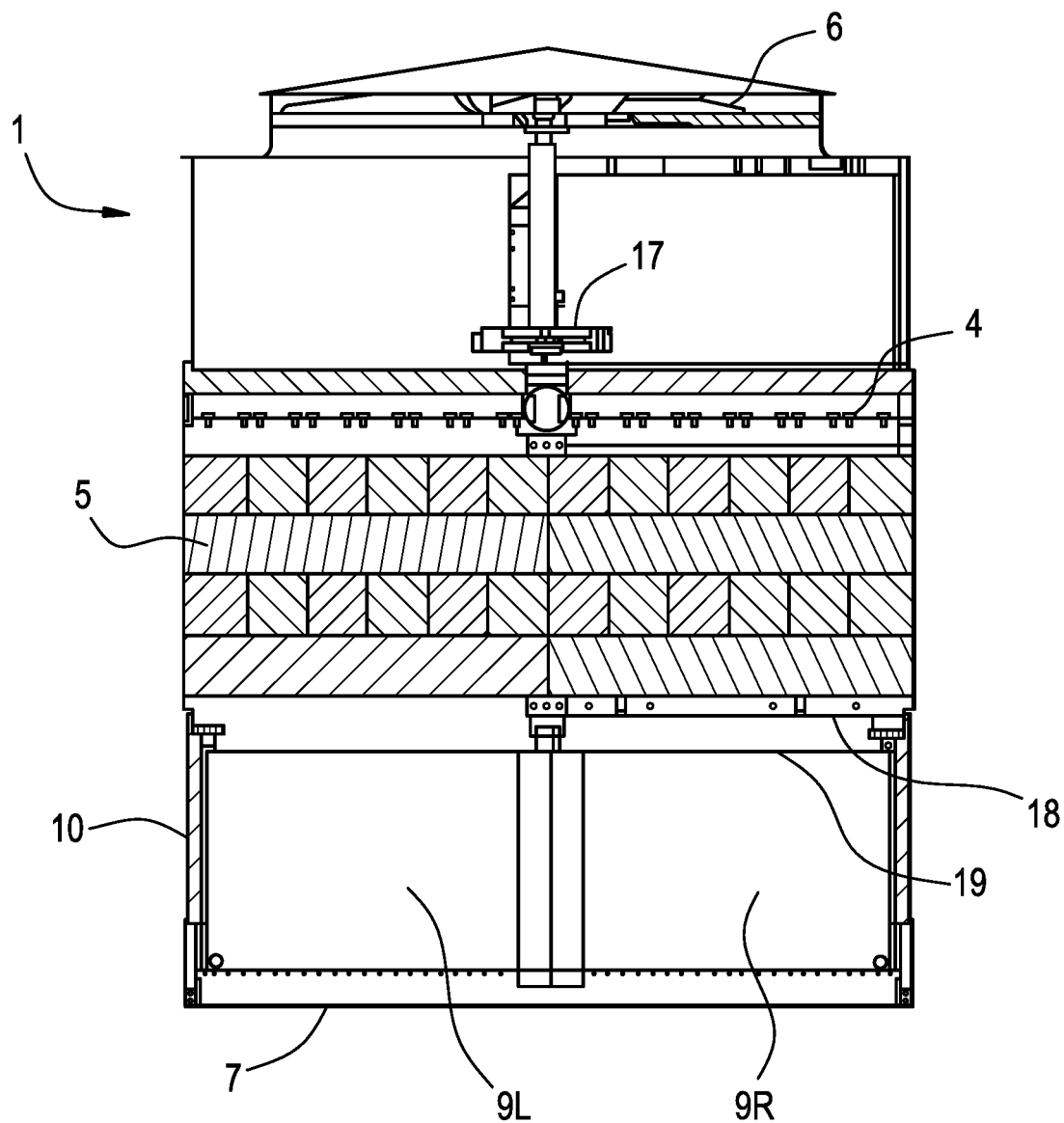
FIG. 2 is a side view of a direct heat exchange apparatus in accordance with the present invention.

Referring now to FIG. 1 of the drawings, embodiment 1 of the present invention is shown in an evaporative cooling tower with direct heat exchange apparatus. Embodiment 1 is comprised of casing 2, direct heat exchange fill pack 5, evaporative water spray assembly 4, lower water collection sump 3, fan assembly 6, air inlet louvers 10, corner vertical support 8 and wind walls 9L and 9R. Wind walls 9L and 9R form the left and right side of the rain zone from side 7. Embodiment 1 is generally enclosed in casing 2, which can be made of thin sheet of metal or fiber reinforced plastic. Casing 2 provides a housing for fill pack 5, evaporative water spray assembly 4, fan assembly 6, and lower water collection basin 3. Fan assembly 6 draws in air through air inlet louvers 10 and the air then turns generally upward in counterflow with respect to the evaporative water flowing generally downwards through direct heat exchange fill packs 5. Air inlet louvers 10 serve to guide the entering air generally perpendicular to the entire side 7 of the cooling tower. It should be understood that there are inlet louvers 10 installed around the entire perimeter of embodiment 1 but several of the inlet louvers have been removed to show internal wind walls 9L and 9R for clarity. It should be further understood that there are two wind walls, a left and a right, for each side or rain zone of embodiment 1. It should be noted that wind wall 9L begins at the front corner of side 7 while wind wall 9R begins at the front right corner of side 7 and wind walls 9L and 9R converge together to meet near the center of the cooling tower. Under normal non-windy circumstances, fan 6 induces airflow through inlet louvers 10. The air entering inlet louvers 10 comes in generally perpendicular to the inlet louvers then turns generally upward towards fill packs 5 then through a set of eliminators (not shown) and finally out of the cooling tower by fan system 6. In extreme wind conditions, without the wind walls, wind can gust through the inlet louvers 10 and cause the falling rain zone water to impinge on the inlet louvers 10 on the opposite side and even cause rain zone water to surge through opposite side inlet louvers 10. This condition is particular unfavorable when the ambient temperature is below freezing as water either freezes on the inlet louvers 10 blocking airflow or any rain zone water that surges through inlet louvers 10 and leaves the cooling tower freezes on the ground around the cooling tower. In extreme wind conditions, with the wind wall 9L and 9R installed, as wind gusts through inlet louvers 10, no matter what direction the wind is coming from, inlet louvers 10 slow down the velocity of the wind and change the direction of the wind to be generally perpendicular to the inlet louvers 10 and then the wind runs into the converging wind walls 9L and 9R which blocks the wind so it can only go up through the fill blocks 5. As the fan systems are usually on a variable speed drive, the fan speed will be controlled to compensate for extreme wind gusts to maintain the proper water outlet temperature. Referring now to FIG. 2, embodiment 1 from FIG. 1 is shown from a side view. All of the components described in FIG. 1 are the same however from this view it can be seen that the top 19 of wind walls 9L and 9R can stop near the top of inlet louvers 10 such that there is a gap between the bottom of the direct fill decks 5 and the top of the wind walls 19. This gap can be anywhere from 1" to several feet. The purpose of this gap is to allow the wind gusts to go over top of the wind walls 9L and 9R and not necessarily turn and push all the way up through fill decks 5. This is to allow the wind to relieve itself to the other side with much lower velocity which allows better control of the cooling tower under severe wind and low temperature conditions.

Figure 3:
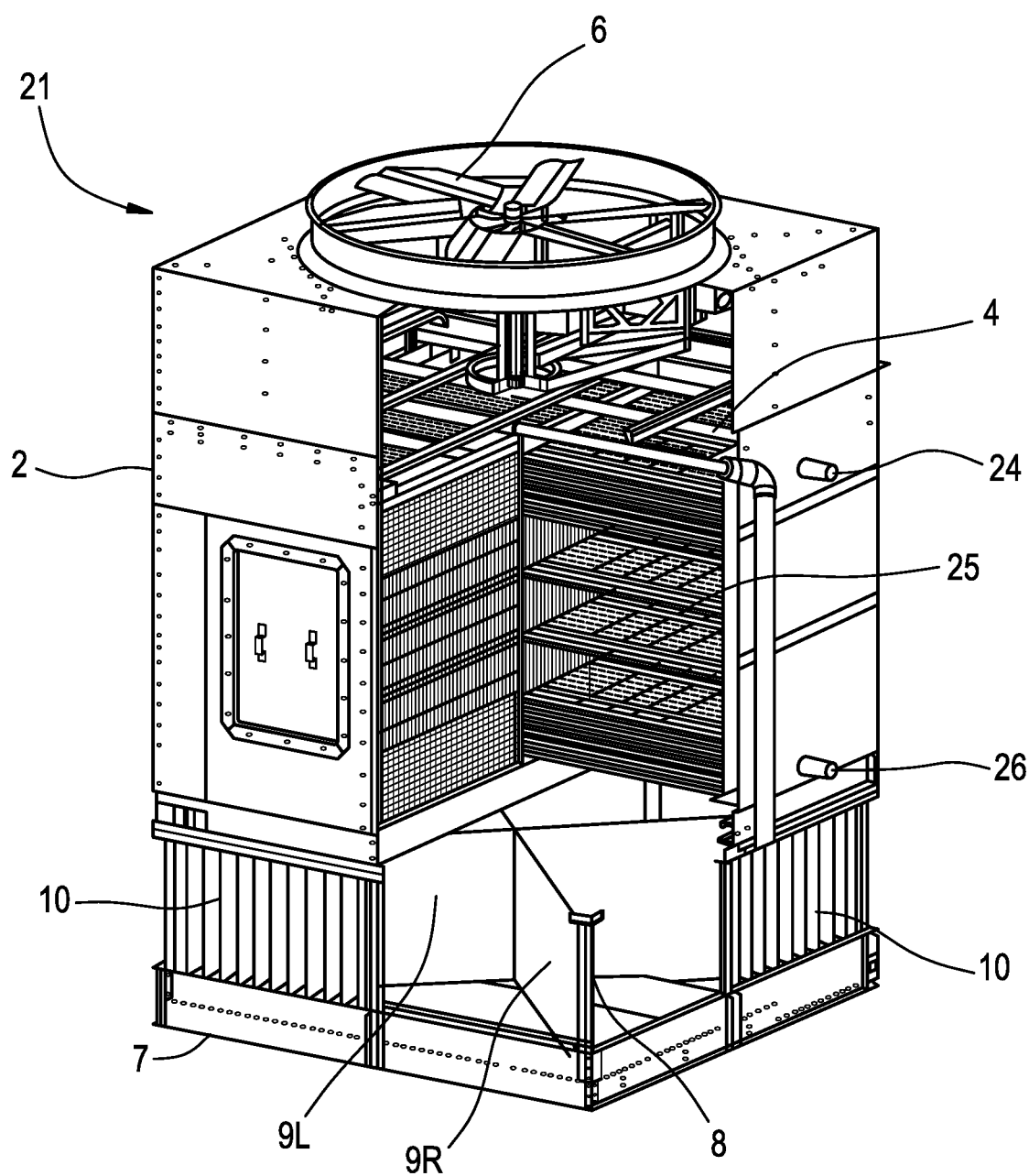
FIG. 3 is a perspective view of a combination indirect and direct heat exchange apparatus in accordance with the present invention.

Referring now to FIG. 3 of the drawings, embodiment 21 of the present invention is shown which is essentially identical to the embodiment in FIGS. 1 and 2 except the evaporative heat exchanger 25 in an indirect type having internal fluid header connections 24 and 26. Indirect heat exchange section 25 can be seen with gaps which can either be left empty as shown or a direct heat exchange surface may be installed there as known in the art. Whether the evaporative heat exchange section is a direct section only as shown in FIGS. 1 and 2, or an indirect section as shown in FIG. 3, users skilled in the art will recognize that the wind walls system incorporating inlet louvers and wind walls will work no matter what style evaporative heat exchanger is installed.

Figure 4:
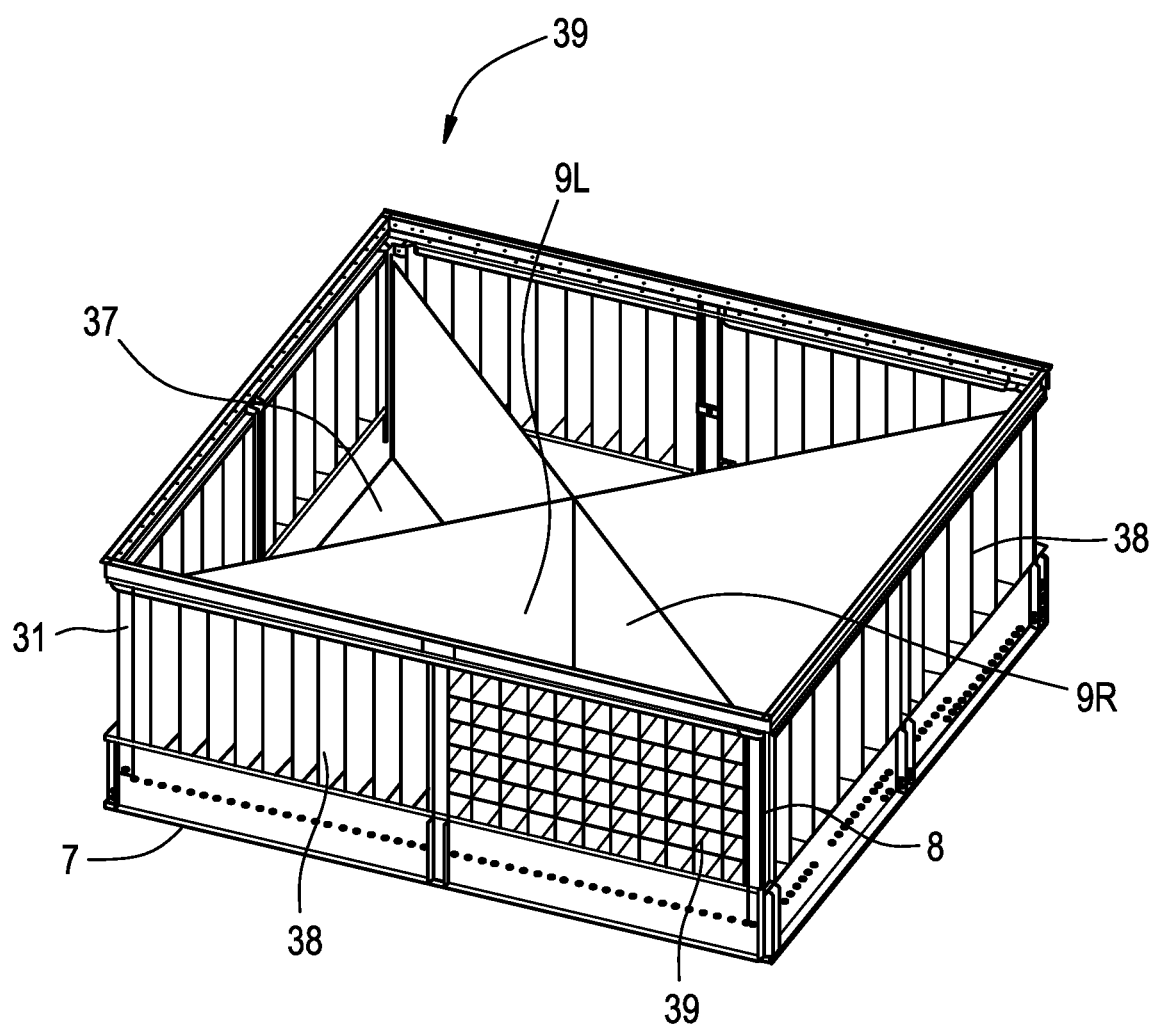
FIG. 4 is a perspective view of a wind wall system in accordance with the present invention.

Referring now to FIG. 4 of the drawings, embodiment 39 shows more clearly the components of the wind wall system of the prior figures. Lower water collection basin 37 collects rain zone water that rains off of the indirect or direct heat exchange section. It can be seen that inlet louvers 38 can be of the vertical blade type or the inlet louvers may have individual channels as shown as 39. The inlet louvers may be of any commercially available type or design as long as the inlet louvers serve to slow the wind gusts velocity and direct the wind generally perpendicular to the inlet louvers. Wind wall 9L can be seen starting from the front left corner of bottom panel 7 while wind wall 9R can be seen starting from the front right corner of bottom panel 7 and wind walls 9L and 9R can be seen converging generally near the center of embodiment 39. Wind wall 9L is attached to vertical support 31 while wind wall 9R is attached to vertical support 8.

Figure 5A:
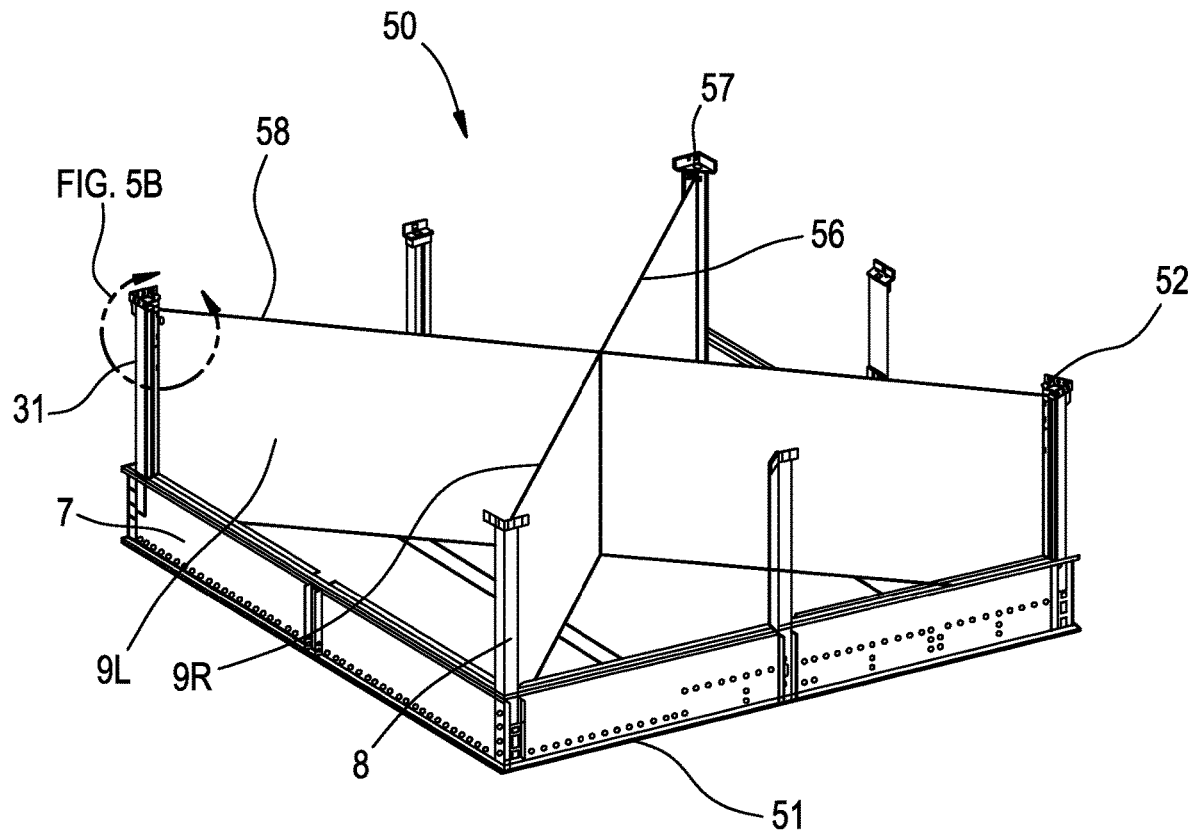
FIG. 5a is a perspective view of a wind wall system in accordance with the present invention

Referring now to FIG. 5a of the drawings, embodiment 50 is shown with all of the inlet louvers removed for clarity. Wind wall 9L starts from front corner of side 7 and is attached to corner vertical support 31 while wind wall 9R starts from the front right corner of side 7 and is attached to corner vertical support 8. Note that there are essentially two wind walls for each side and that wind wall 9R also becomes the left wind wall for side 51. Wind wall 9R can run continuous from vertical support 8 to the back corner of vertical support 57 and if desired supported by channel 56. Wind wall 9L can run continuous from vertical support 31 to the back corner of vertical support 52 and if desired supported by channel 58. Wind walls 9L and 9R may be made of any rigid material such as galvanized sheet metal, stainless steel sheet metal, or any suitable weather resistant flexible material such as canvas or PVC. Some customers may choose to install the wind walls only in the winter time to allow for ease of maintenance and proper operation during the warmer months.

Figure 5B:
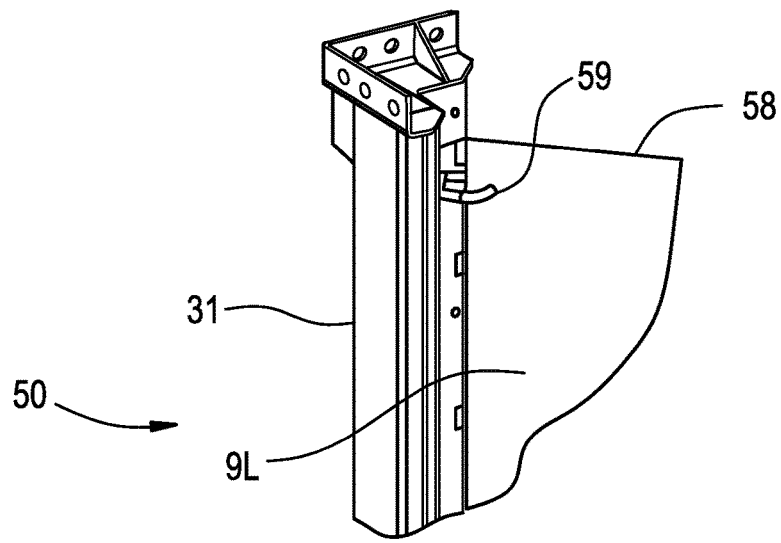
FIG. 5b is a detail view of a wind wall embodiment in accordance with the present invention

Referring now to FIG. 5b, embodiment 50 is shown with detail A. Eyehook 59 attaches wind wall 9L to vertical support 31 while support 58 also attaches to vertical support 31. The means of attachment is not important but this attachment must stand up to gusty wind conditions.

Figure 6:
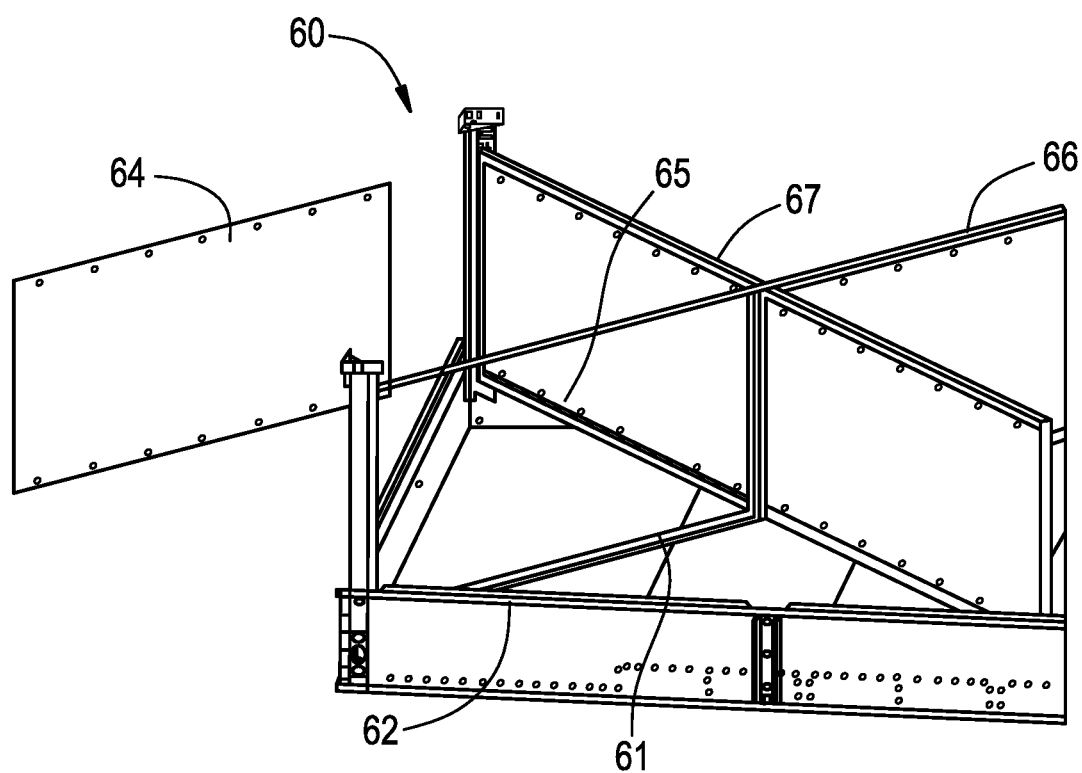
FIG. 6 is a perspective view of a wind wall system in accordance with the present invention

Referring now to FIG. 6, embodiment 60 is shown with the inlet louvers removed for clarity. The wind walls shown in embodiment 60 have lower frames 61 and 65 and upper frames 66 and 67. Wind wall 64 is shown removed from frame 61 and 66. Wind wall 64 can be installed only in the winter time if desired. Wind wall 64 can be made of galvanized or stainless steel sheet metal or any other semi rigid material and can be screwed or bolted into frames 61 and 66.

Figure 7:
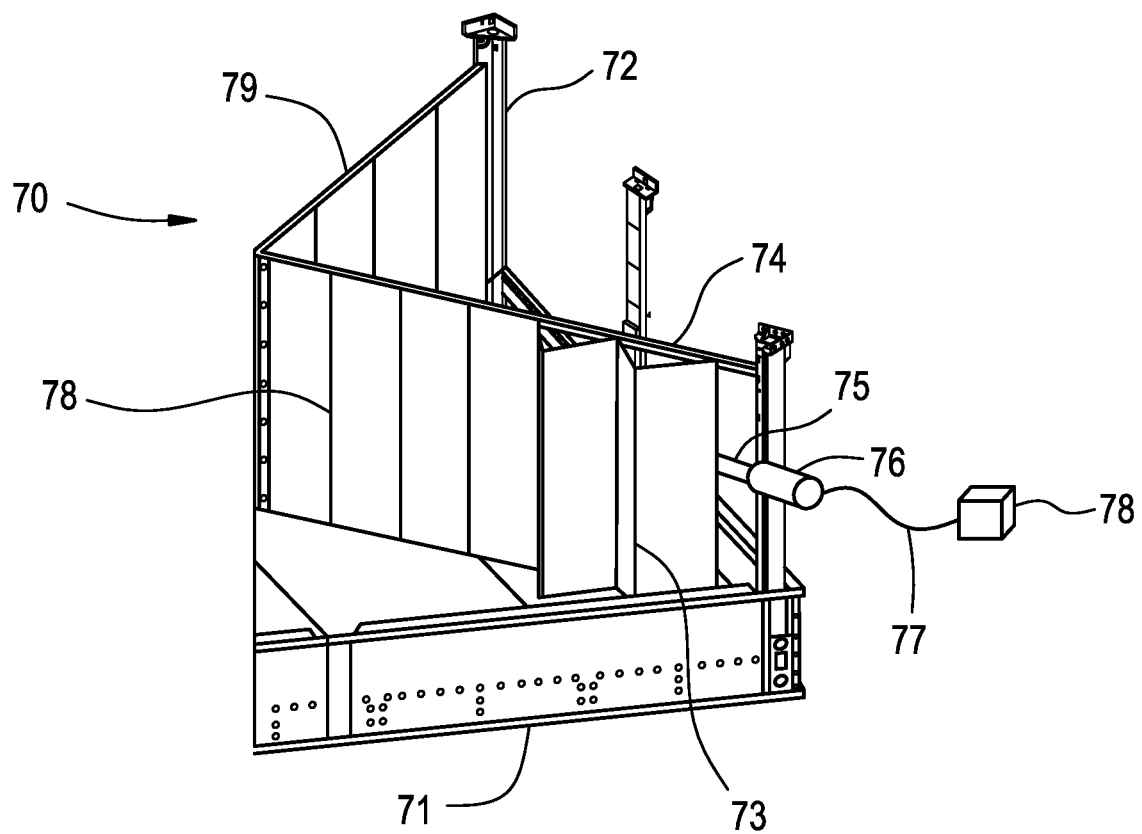
FIG. 7 is a perspective view of a wind wall system in accordance with the present invention

Referring now to FIG. 7, embodiment 70 is shown with movable wind walls 73. Accordion style or folding style wind wall 73 is shown being attached to linkage 75 and actuator 76. Upon a call for opening or closing from controller 78 connected by wire or pneumatic line 77, actuator 76 moves linkage in or out to open or close wind wall 73. One example of when the wind wall might be operated would be at a temperature below 40F, the wind walls should be closed but can be reopened above 45F ambient temperature to restore ease of maintenance and full cooling tower operation.

Figure 8:
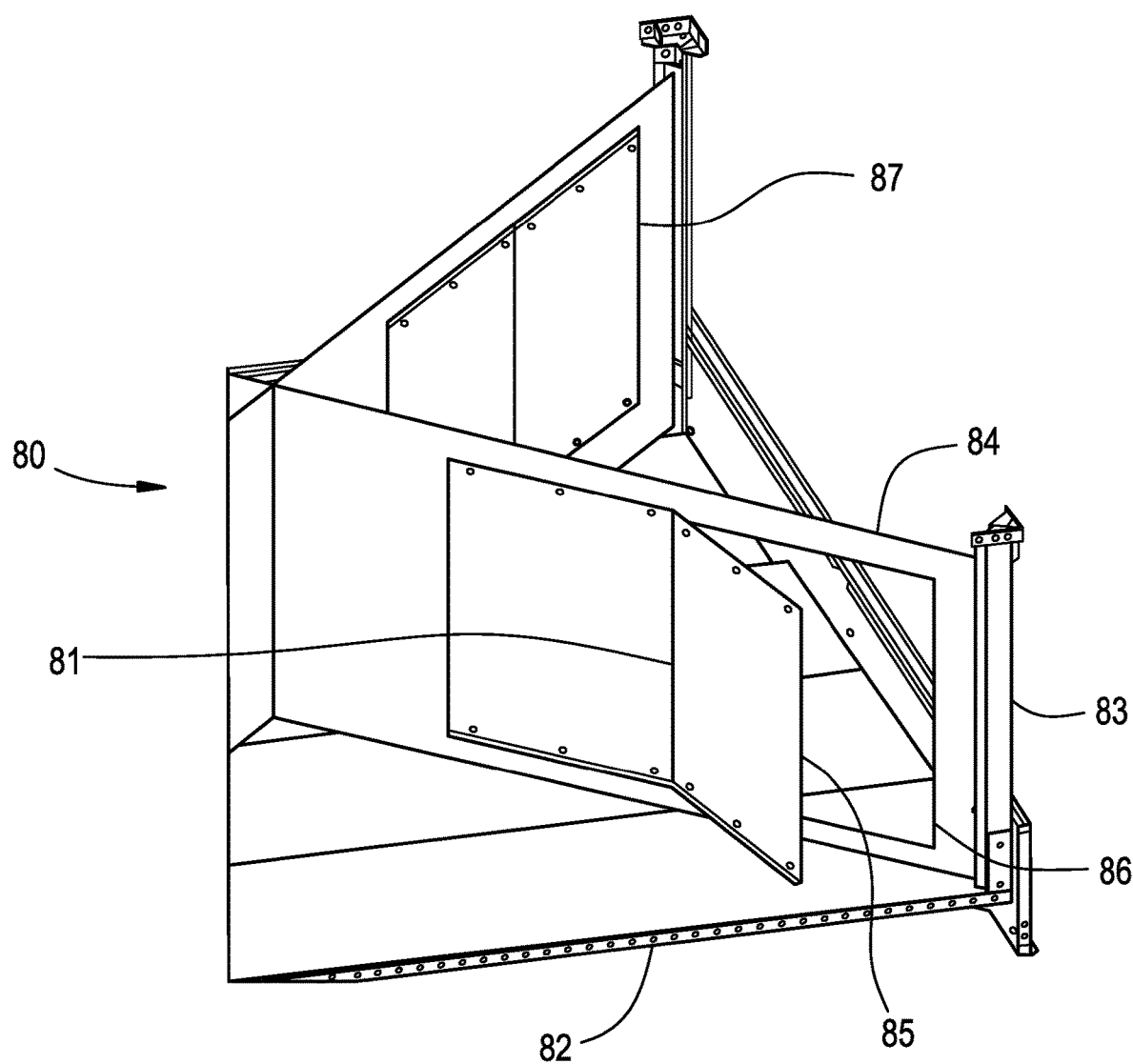
FIG. 8 is a perspective view of a wind wall system in accordance with the present invention.
Figure 9:
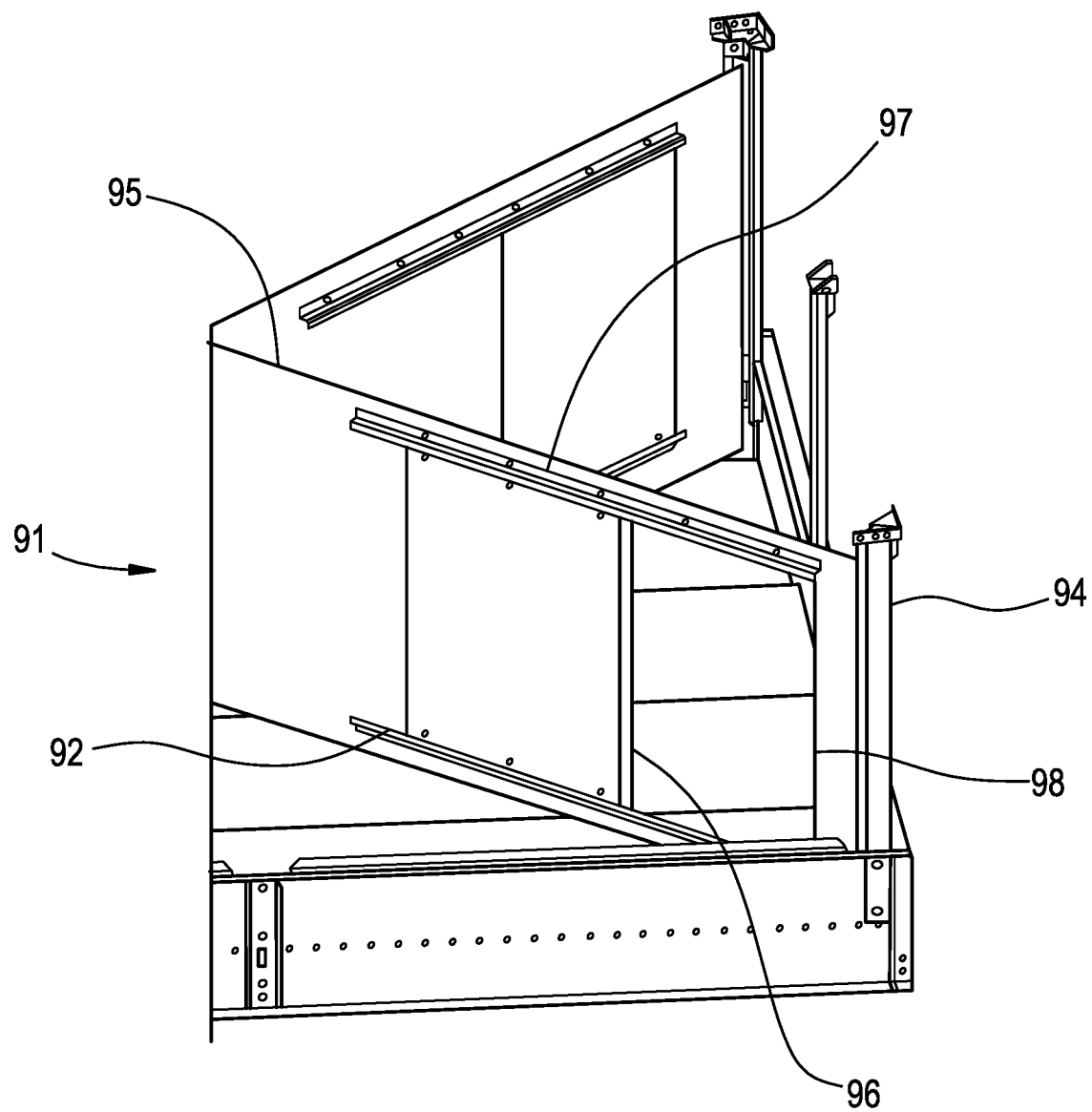
FIG. 9 is a perspective view of a wind wall system in accordance with the present invention.
Figure 10:
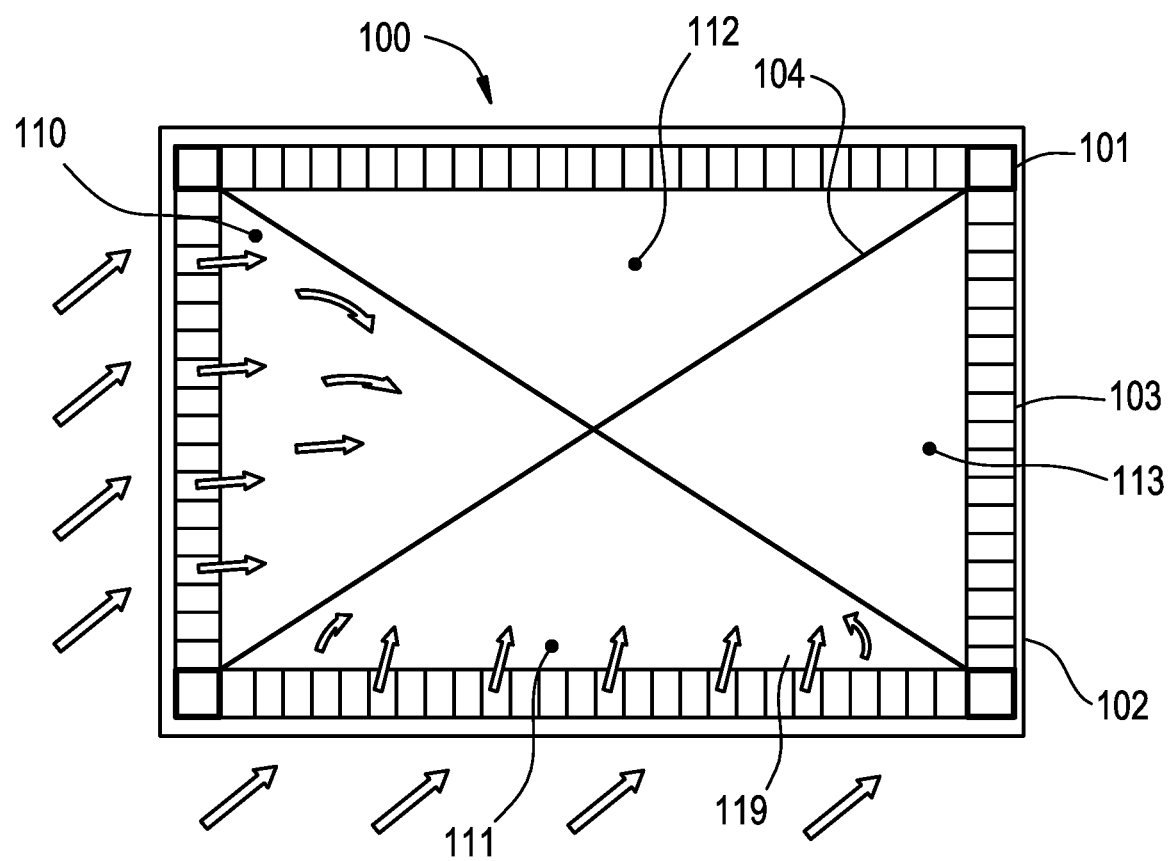
FIG. 10 is diagrammatic view of wind streamlines in accordance with the present invention

Referring now to FIG. 8, embodiment 80 is shown with wind walls 85 and 87 which can be folded into or out of place. For wind wall 85, permanent frame members 84 and 86 are attached to vertical corner support 83. Wind wall 85 is shown bent away from frame 84 and 86 where it can be folded back for summer time use or folded closed for winter time use. Referring now to FIG. 9, embodiment 91 is shown with sliding wind wall 96. Frames 98 and 95 are attached to vertical support 94 and tracks 92 and 97 are attached to frames 95 and 98. Wind wall 96 can slide within track 92 and 97 and be opened or closed when desired. Referring now to FIG. 10, embodiment 100 is shown in a plan view with wind walls 104 attached to vertical support 101 and inlet louvers 103 surrounding the perimeter of embodiment 100. As an example, when a strong wind is blowing from the left to the right, the wind wall system components operate together to block the wind from migrating from one rain zone to another. Thus the wind wall system consists of the bottom water collection sump 119, top evaporative heat exchanger (not shown for clarity of view), inlet louvers 103 and wind walls 104. The wind wall system components operate together to slow then guide the wind at angles generally perpendicular to the air entrance faces and the wind walls 104 divide the plenum generally diagonally into at least four independent rain zones 110, 111, 112, 113, extending to all four corners of the plenum and converging and joining generally in the middle of the plenum thus preventing the wind from blowing outside of whichever zone the wind enters which keeps the falling rain zone water from blowing through to any of the other zones but rather the wind can be relieved and travel up through the top evaporative heat exchanger.

Figure 11:
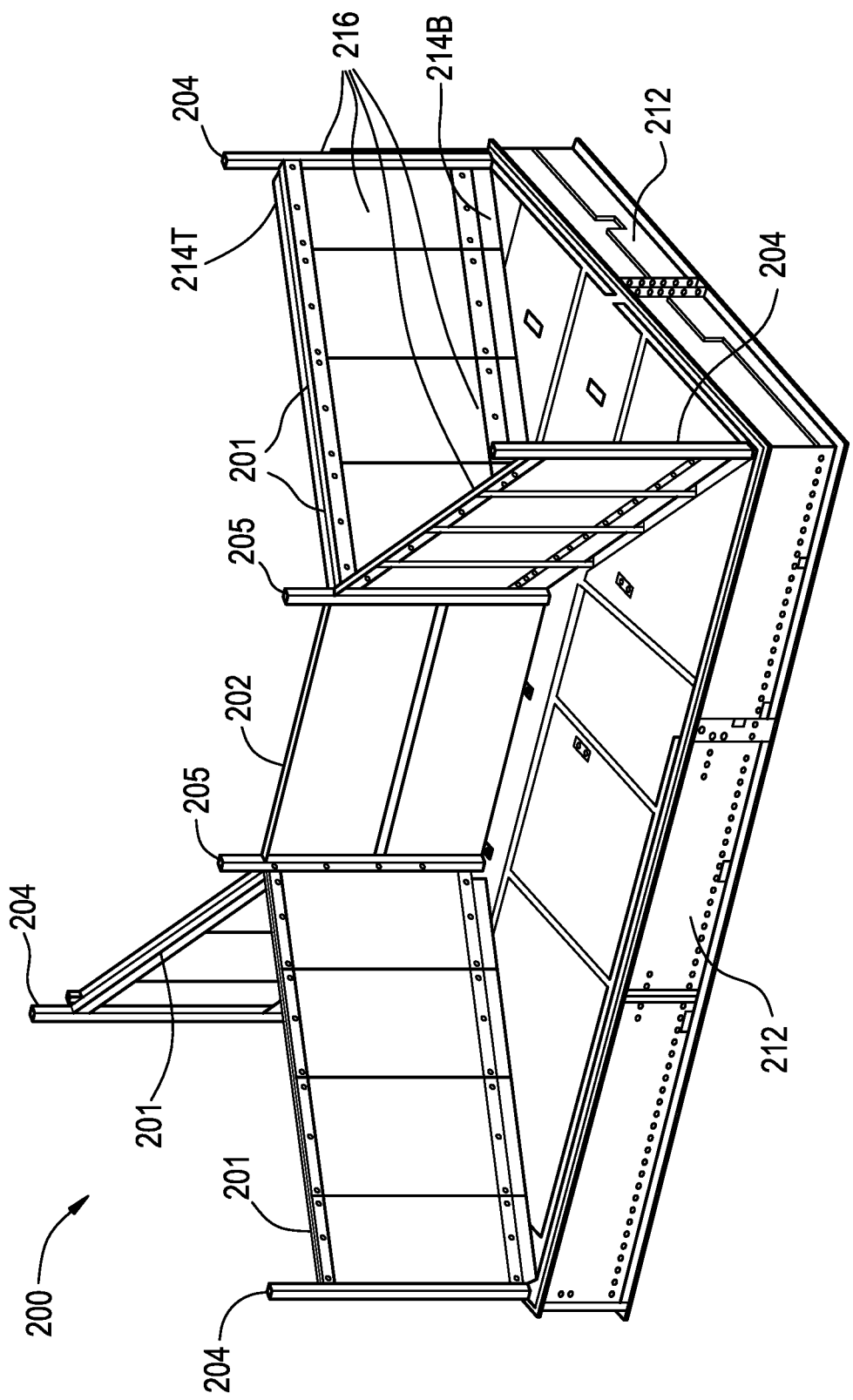
FIG. 11 is a perspective view of a wind wall system for a rectangular embodiment of the present invention

Referring now to FIG. 11, embodiment 200 is shown with the wind wall system applied for a more rectangular footprint evaporative heat exchange apparatus. Bottom pan section 212 of embodiment 200 is shown with removable wind walls 201 and permanent wind walls 202. Note that the inlet louvers have been removed for clarity. Removable panels 216 are installed to top support 214T and bottom support 214B to make up wind wall 201. Like the other embodiments, wind walls 201 start at the vertical corner supports 204 and meet generally near center of the evaporative heat exchange apparatus and in this case at center vertical supports 205. Note that there are essentially two wind walls for each side with the wind walls 201 on the long side of embodiment 200 being joined generally in the center by support 205 and middle wind wall 202. Middle wind wall 202 is typically permanently installed but can be removed if needed whereas wind wall panels 216 are intended to be removable when desired. The wind blocking operation of embodiment 200 in FIG. 11 operates exactly the same as explained in FIG. 10 except permanent middle wind wall 202 is required for more rectangular designs.

Referring now to FIG. 12, embodiment 300 is shown for a multiple cell arrangement of an evaporative heat exchange apparatus. Left cell bottom pan section 301, middle cell bottom pan section 302 and right cell bottom pan section 303, when bolted together, make-up a three cell evaporative heat exchange arrangement. Note that the inlet louvers have been removed for clarity. On a two cell arrangement, center bottom section 302 would be omitted. Note that the wind wall system contains middle walls 310 on all three cells, 301, 302 and 303. Middle wind walls 310 are typically permanently installed but can be removed if desired. Left bottom pan section cell 301 and right bottom pan section cell 303 contain optionally removable wind wall panels 312. It should be noted that in the view shown, there are actually eight removable panels 312 on left cell bottom pan section 301 and eight removable panels 312 on right cell bottom pan section 303. As in all other embodiments, wind walls 312 start at the vertical corner support 305 and meet generally in the center of embodiment 300 at vertical center support 304. Middle wind walls 310 are typically permanently installed across the full length of the evaporative heat exchange apparatus in embodiment 300. The wind blocking operation of embodiment 300 in FIG. 12 operates exactly the same as explained in FIG. 10 except permanent middle wind walls 310 are required for multiple cell arrangements.

What is claimed is:

1. A cooling tower comprising a heat exchange section having a bottom edge, a fan for moving air through the heat exchange section, a water distribution assembly to provide water onto and through the heat exchange section, an air inlet section through which air is drawn into the cooling tower and the heat exchange section, the air inlet section having outside edges and corners, and a wall assembly in the air inlet section, the wall assembly having an upper edge and extending from the corners of the air inlet section inwardly, wherein the wall assembly is arranged in the air inlet section to form a wind relief gap between the upper edge of the wall assembly and the bottom edge of the heat exchange section, the wind relief gap having a size configured to allow at least a portion of wind entering the air inlet section to pass over the upper edge of the wall assembly without entering into the heat exchange section.

2. The cooling tower of claim 1
wherein most of the water passing through the heat exchange section enters the air inlet section,
further comprising a sump beneath the air inlet section, wherein the sump collects the water passing through the air inlet section.

3. The cooling tower of claim 1
wherein the air inlet section is comprised of a structure having outside edges and corners,
and the wall assembly is comprised of a plurality of wall panel sections, each wall panel section having an outer edge at a corner of the air inlet section, each wall panel section extending inwardly from the corner of the air inlet section to a junction point wherein an inner edge of each wall panel section meets.

4. The cooling tower of claim 1
wherein the air inlet section is comprised of a rectangular structure having outside edges and four corners,
and the wall assembly is comprised of a plurality of wall panel sections, each wall panel section having an outer edge at a corner of the air inlet section, each wall panel section extending inwardly from the corner of the air inlet section to a junction point wherein an inner edge of each wall panel section meets.

5. The cooling tower of claim 1
wherein the wall assembly comprises a plurality of wall panel sections,
wherein each wall panel section is comprised of one of the following: steel, stainless steel, aluminum, canvas, or structural plastic.

6. The cooling tower of claim 1
wherein the wall assembly comprises a plurality of wall panel sections,
wherein each wall panel section is removable.

7. The cooling tower of claim 1
wherein the wall assembly acts to keep most of the water entering the air inlet section from exiting the cooling tower.

8. The cooling tower of claim 2
wherein the wall assembly acts to have most of the water exiting the air inlet section enter the sump.

9. The cooling tower of claim 1
further comprising a center wall section in the air inlet section,
wherein the air inlet section is comprised of a structure having outside edges and corners,
and the wall assembly is comprised of a plurality of wall panel sections, each wall panel section having an outer edge at a corner of the air inlet section, each wall panel section extending inwardly from the corner of the air inlet section to a junction point wherein an inner edge of each wall panel section meets with the center wall section.

10. The cooling tower of claim 9
wherein the center wall section has two ends, and two of the wall panel sections meet at one center wall section end.

11. The cooling tower of claim 1, wherein the gap between the upper edge of the wall assembly and the bottom edge of the heat exchange section is greater than or equal to one inch.

12. The cooling tower of claim 1, wherein the wind relief gap is of a size configured to facilitate the passage of wind gusts through the cooling tower without affecting the cooling operation of the cooling tower.

13. A cooling tower comprising
a heat exchange section,
a fan for moving air through the heat exchange section,
a water distribution assembly to provide water onto and through the heat exchange section,
an air inlet section through which air is drawn into the cooling tower and the heat exchange section,
the air inlet section having outside edges and corners,
and a wall assembly in the air inlet section,
the wall assembly extending from the corners of the air inlet section inwardly
wherein the air inlet section is comprised of a structure having outside edges and corners,
and the wall assembly is comprised of a plurality of wall panel sections, each wall panel section having an outer edge at a corner of the air inlet section, each wall panel section extending inwardly from the corner of the air inlet section to a junction point wherein an inner edge of each wall panel section meets, and
wherein at least one of the wall panel sections is configured to be at least one of folded inwardly, folded to an open position, and slid to an open position.

14. A cooling tower comprising
a heat exchange section having a bottom edge,
a fan for moving air through the heat exchange section,
a water distribution assembly to provide water onto and through the heat exchange section,
an air inlet section through which air is drawn into the cooling tower and the heat exchange section,
the air inlet section having outside edges and corners,
and a wall assembly in the air inlet section,
the wall assembly extending from the corners of the air inlet section inwardly,
further comprising a center wall section in the air inlet section,
wherein the air inlet section is comprised of a structure having outside edges and corners,
and the wall assembly is comprised of a plurality of wall panel sections, each wall panel section having an upper edge and an outer edge at a corner of the air inlet section, each wall panel section extending inwardly from the corner of the air inlet section to a junction point wherein an inner edge of each wall panel section meets with the center wall section, and
wherein the wall assembly is arranged in the air inlet section to form a wind relief gap between the upper edge of the wall assembly and the bottom edge of the heat exchange section, the wind relief gap having a size configured to allow at least a portion of wind entering the air inlet section to pass over the upper edge of the wall assembly without entering into the heat exchange section.

15. The cooling tower of claim 14
wherein most of the water passing through the heat exchange section enters the air inlet section,
further comprising a sump beneath the air inlet section, wherein the sump collects the water passing through the air inlet section.

16. The cooling tower of claim 14
wherein each wall panel section is comprised of one of the following: steel, stainless steel, aluminum, canvas, or structural plastic.

17. The cooling tower of claim 14
wherein the wall assembly comprises a plurality of wall panel sections,
wherein each wall panel section is removable.
18. The cooling tower of claim 14
wherein the wall assembly acts to keep most of the water entering the air inlet section from exiting the cooling tower.
19. The cooling tower of claim 14
wherein the wall assembly acts to have most of the water exiting the air inlet section enter the sump.
20. The cooling tower of claim 14
wherein the center wall section has two ends, and two of the wall panel sections meet at one center wall section end.
21. The cooling tower of claim 14, wherein the gap between the upper edge of the wall assembly and the bottom edge of the heat exchange section is greater than or equal to one inch.
22. The cooling tower of claim 14, wherein the wind relief gap is of a size configured to facilitate the passage of wind gusts through the cooling tower without affecting the cooling operation of the cooling tower.
23. A cooling tower comprising
a heat exchange section,
a fan for moving air through the heat exchange section,
a water distribution assembly to provide water onto and through the heat exchange section,
an air inlet section through which air is drawn into the cooling tower and the heat exchange section,
the air inlet section having outside edges and corners,
and a wall assembly in the air inlet section,
the wall assembly extending from the corners of the air inlet section inwardly,
further comprising a center wall section in the air inlet section,
wherein the air inlet section is comprised of a structure having outside edges and corners, and the wall assembly is comprised of a plurality of wall panel sections, each wall panel section having an outer edge at a corner of the air inlet section, each wall panel section extending inwardly from the corner of the air inlet section to a junction point wherein an inner edge of each wall panel section meets with the center wall section,
wherein at least one of the wall panel sections can be folded inwardly, folded to an open position, or slid to an open position.
24. A cooling tower comprising
a heat exchange section,
a fan for moving air through the heat exchange section,
a water distribution assembly to provide water onto and through the heat exchange section,
an air inlet section through which air is drawn into the cooling tower and the heat exchange section,
the air inlet section having outside edges and corners,
and a wall assembly in the air inlet section,
the wall assembly extending from the corners of the air inlet section inwardly,
further comprising a center wall section in the air inlet section,
wherein the air inlet section is comprised of a structure having outside edges and corners, and the wall assembly is comprised of a plurality of wall panel sections, each wall panel section having an outer edge at a corner of the air inlet section, each wall panel section extending inwardly from the corner of the air inlet section to a junction point wherein an inner edge of each wall panel section meets with the center wall section,
further comprising an actuator to retract the wall panel sections.

* * * * *